N. McCARTY.
FUEL PUMP.
APPLICATION FILED FEB. 4, 1909.

929,970.

Patented Aug. 3, 1909.

Witnesses
Walter Troemel.
Thomas H. M. Means

Inventor
Norman McCarty.
By
Bradford Hood
Attorneys

UNITED STATES PATENT OFFICE.

NORMAN McCARTY, OF INDIANAPOLIS, INDIANA, ASSIGNOR TO ATLAS ENGINE WORKS, OF INDIANAPOLIS, INDIANA, A CORPORATION OF INDIANA.

FUEL-PUMP.

No. 929,970.    Specification of Letters Patent.    Patented Aug. 3, 1909.

Application filed February 4, 1909. Serial No. 476,046.

*To all whom it may concern:*

Be it known that I, NORMAN McCARTY, a citizen of the United States, residing at Indianapolis, in the county of Marion and State of Indiana, have invented certain new and useful Improvements in Fuel-Pumps, of which the following is a specification.

The object of my invention is to produce a governing pump having a member by means of which the discharging effect of a fixed stroke displacing plunger may be readily varied from maximum to minimum, the construction being such that the measuring member will never be subjected to high pressures, necessary for the discharging action, and therefore such that a very sensitive speed controlled governor may be used to accomplish the adjustment of the measuring member.

The accompanying drawings illustrate my invention.

Figure 1:
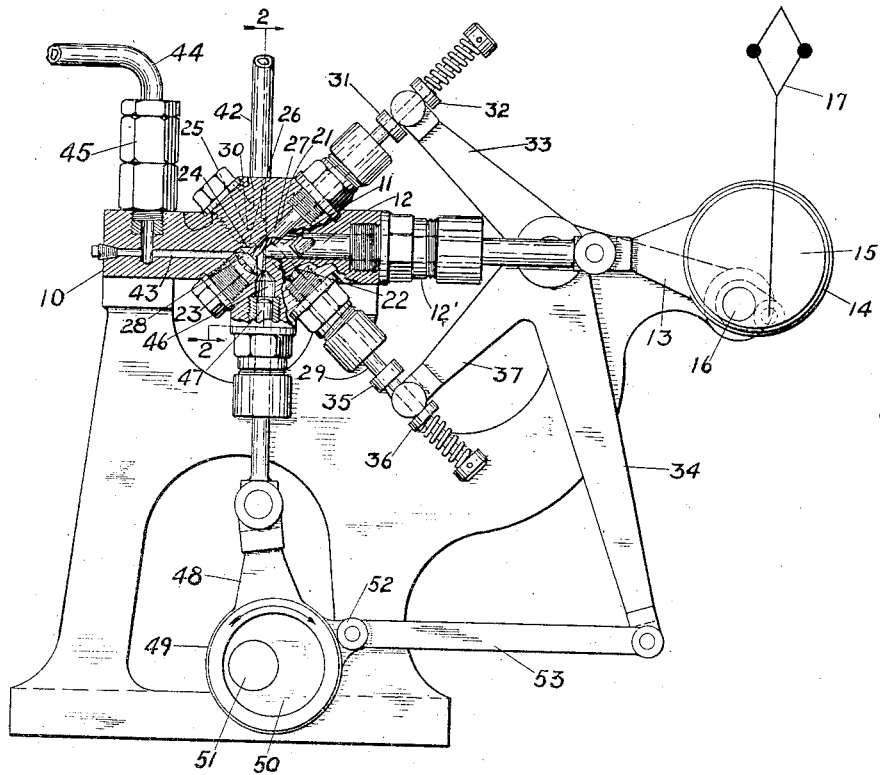
Figure 2:
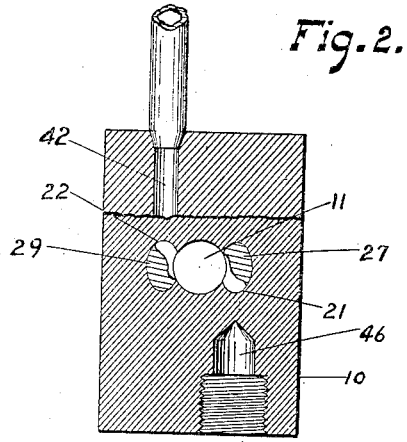

Figure 1 is an elevation in partial vertical section of a pump embodying my invention, the section being taken upon two slightly separated parallel planes one through the axis of the measuring member and the other through the axis of one of the valves, and Fig. 2 a section on line 2—2 of Fig. 1.

In the drawings, 10 indicates the main body of the pump structure in which is formed a cylindrical measuring chamber 11 within which is slidably mounted a measuring plunger 12 which is extended outwardly through a suitable packing gland 12′ and is connected at its outer end to any suitable means for its reciprocation. In the drawings such means is shown as an arm 13 carried by an eccentric strap 14 mounted upon an eccentric 15 carried by a rock shaft 16 which, in turn, is connected to a speed control governor shown diagrammatically at 17. Formed in body 10 are two passages 21 and 22 which are off-set upon opposite sides of the measuring chamber 11 by an amount less than the radius of chamber 11 so that said two chambers 21 and 22 intersect and communicate with the measuring chamber 11 at the inner end thereof. The two passages 21 and 22 might be formed in any other desirable manner to produce a communication between said two passages and the measuring chamber 11 but the particular arrangement shown has been adopted in order to reduce necessary clearance to the least possible amount and to gain a compact arrangement so that the parts may be readily operated. Passage 21 communicates with an ejection chamber 23 through an intervening valve seat 24, and passage 22 communicates with an admission chamber 25 through an intervening valve seat 26. Mounted in passage 21 is a valve stem 27 which carries at its inner end a valve 28 adapted to seat in valve seat 24, and mounted in passage 22 is a valve stem 29 carrying a valve 30 at its inner end which valve is adapted to seat in seat 26. At its outer end, stem 27 is provided with a fixed head 31 and with a yieldingly movable head 32 between which heads extends one arm 33 of an operating lever 34. Similarly stem 29 is provided with a fixed head 35 and a yieldingly movable head 36 between which lies an arm 37 of lever 34. Leading into chamber 25 is an oil inlet 42. Leading from chamber 23 is a discharge passage 43 which communicates with a discharge pipe 44 through a suitable outwardly opening check valve 45, the pipe 44 being led to any desired point. The structure is especially adapted for use in connection with the atomizer of an internal combustion engine wherein the fuel is injected into the combustion chamber against the compression therein by means of a higher air pressure so that there is, in this use of the apparatus, a maintained pressure in pipe 44 of a considerable amount, as high as 1,000 lbs. to the square inch.

Communicating with chamber 23 is a pump chamber 46 in which is mounted a pump piston 47 which may be given reciprocation by any suitable means, preferably one which produces a fixed stroke, and in the drawings shown as an arm 48 carried by an eccentric strap 49 mounted upon an eccentric 50 carried by a shaft 51 rotated in any suitable manner in synchronism with the engine to be served. Eccentric 49 may conveniently carry an ear 52 which is connected to lever 34 by means of a link 53.

The operation is as follows:—The arms 33 and 37 of lever 34 are so connected with the valves 28 and 30 that they will be opened and closed in alternation, each valve reaching its seat before the other is unseated, the yielding collars 32 and 36 permitting this action. The inner end of the measuring plunger 12 is so formed that it may be brought into close conjunction with the stems 27 and 29 so that there will be practically no clearance. Chamber 25 is kept continuously filled with oil from a suitable source of supply and a rotation of shaft 51, in the direction indicated by the arrow, will first continue the downward or outward movement of piston 47 so that any oil within chamber 11 will be drawn down into chamber 23 and cylinder 46. Thereupon valve 28 will be brought to its seat and an inward movement of piston 47 will eject oil through passage 43 past valve 45 into pipe 44. During this time, and while valve 28 is seated, valve 30 will be moved away from its seat so that oil may flow from chamber 25 into the measuring chamber 11 and the volume of this chamber 11 will be determined by the action of the speed control governor 17, the measuring plunger 12 being moved in or out so as to decrease or increase the receiving volume of chamber 11 according to the immediate needs of the engine. At this time, it will be noticed, the measuring plunger 12 is not subjected to any of the pressure which is being exerted upon the fuel being discharged past valve 45. Before plunger 47 is started upon its next outward stroke, valve 30 is seated and then valve 28 is unseated so that the outward stroke of piston 47 will draw the fuel which is within the measuring chamber 11 down into chamber 23 and cylinder 46, from which point the operation is repeated as already described.

I claim as my invention:

1. A pump comprising a measuring chamber, an admission chamber communicating therewith, a valve arranged between the measuring chamber and admission chamber, an ejection chamber communicating with the measuring chamber, a valve arranged between the measuring chamber and ejecting chamber, ejecting means associated with said ejecting chamber, and means for operating said ejecting means, and for alternately operating the valves.

2. A pump comprising a measuring chamber, an admission chamber communicating therewith, a valve arranged between the measuring chamber and admission chamber, an ejection chamber communicating with the measuring chamber, a valve arranged between the measuring chamber and ejecting chamber, ejecting means associated with said ejecting chamber, means for operating said ejecting means and for alternately operating the valves and means for varying the receptivity of the measuring chamber.

3. A pump comprising a measuring chamber, an admission chamber communicating therewith, a valve arranged between said admission chamber and measuring chamber, an ejecting chamber communicating with the measuring chamber, a valve arranged between said measuring chamber and ejecting chamber, a plunger mounted within the measuring chamber and movable therein to vary the capacity thereof, an ejecting plunger mounted in the ejecting chamber, and means for operating said plungers and valves.

4. A pump comprising a measuring chamber, an admission chamber, an ejection chamber, means for introducing fluid into the measuring chamber from the admission chamber independent of the ejection chamber and for introducing fluid from the measuring chamber into the ejection chamber inuring chamber into the ejection chamber independent of the admission chamber, and means for ejecting fluid from the ejection chamber independent of the admission chamber.

5. A pump comprising a measuring chamber, means for varying the receptivity of said measuring chamber, an admission chamber, an ejection chamber, means for introducing fluid into the measuring chamber from the admission chamber independent of the ejection chamber and for introducing fluid from the measuring chamber into the ejection chamber independent of the admission chamber, and means for ejecting fluid from the ejection chamber independent of the admission chamber.

6. The combination with a pump having a displacing member, an inlet passage, an outlet passage, and an outwardly yielding check-valve in said outlet passage, a measuring means for delivering to said pump through said inlet chamber successive measured variable quantities of material.

7. The combination with a pump having an ejecting member, an inlet passage, an outlet passage, and an outwardly yielding check valve in said outlet passage, of a measuring chamber communicating with said inlet passage of the pump, a valve arranged between said measuring chamber and the pump chamber, means for varying the receptivity of said measuring chamber, and means for operating the valve between said measuring chamber and the pump chamber.

8. In a pump comprising a measuring chamber, a discharge chamber, and an intermediate connection between said two chambers, means for disestablishing said connection, means coöperating with the measuring chamber for discharging variably measured quantities from the measuring chamber into the discharging chamber, and means for positively ejecting material from the ejecting chamber.

In witness whereof, I, have hereunto set my hand and seal at Indianapolis, Indiana, this twenty-ninth day of January, A. D. one thousand nine hundred and nine.

NORMAN McCARTY. [L. S.]

Witnesses:
ARTHUR M. HOOD,
THOMAS W. McMEANS.